United States Patent [19]
Norén

[11] Patent Number: 4,773,221
[45] Date of Patent: Sep. 27, 1988

[54] APPARATUS FOR RECOVERING THE KINETIC ENERGY OF SEA WAVES

[75] Inventor: Sven A. Norén, Bromma, Sweden

[73] Assignee: Interproject Service AB, Bettna, Sweden

[21] Appl. No.: 396,150

[22] Filed: Jul. 8, 1982

[30] Foreign Application Priority Data

Jul. 16, 1981 [SE] Sweden ............... 8104407

[51] Int. Cl.[4] ............................................. F03B 13/12
[52] U.S. Cl. ....................................... 60/501; 60/497; 60/502
[58] Field of Search ............... 60/495, 497, 501, 502; 290/53, 54

[56] References Cited

U.S. PATENT DOCUMENTS 4,203,294 5/1980 Budal et al. ........................ 60/497
4,249,085 2/1981 Kertzman ......................... 60/495 X Primary Examiner—Allen M. Ostrager
Attorney, Agent, or Firm—Bauer & Schaffer

[57] ABSTRACT

Apparatus for recovering kinetic energy bound in the movement of water waves. The apparatus comprises a bouyant unit (2) and an energy-absorbing device connected to the bouyant unit. The energy-absorbing device comprises an immersed rigid piston (6) which is slideably arranged in a substantially vertical, elongate accelerating tube (1) which is intended to be immersed in the water and which is open at both ends thereof. The accelerating tube is connected to the buoyant unit (2) so as to accompany movement of the unit imparted thereto by the wave movement of the water. The working stroke (1) of the piston in the accelerating tube is limited by means of movement-limit means (8,9) incorporated in the accelerating tube and arranged to abrogate the force acting on the piston. In accordance with one suitable embodiment, these movement-limiting means comprise openings (9) arranged in the accelerating tube and co-acting with corresponding openings (8) in the piston (6).

4 Claims, 1 Drawing Sheet

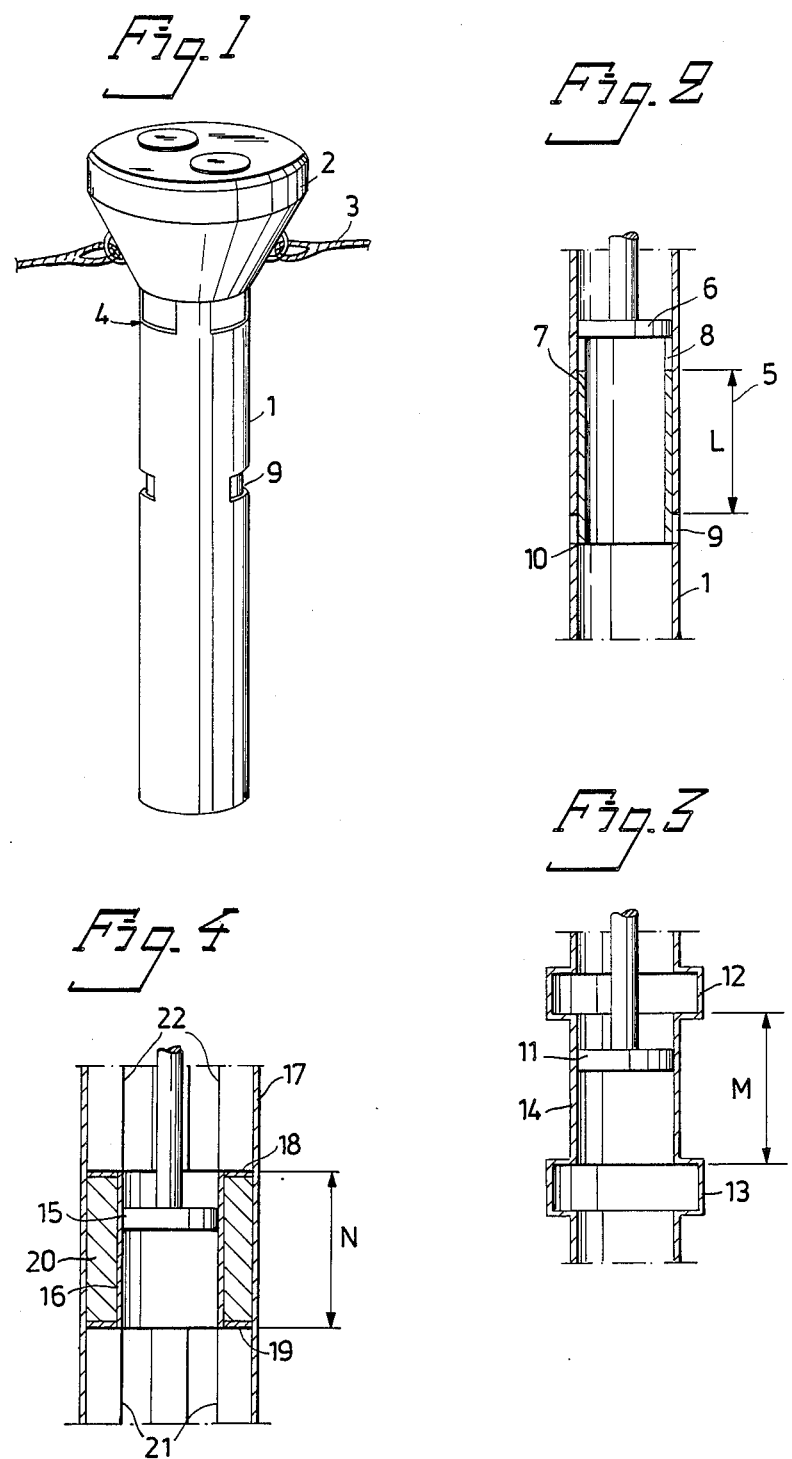

APPARATUS FOR RECOVERING THE KINETIC ENERGY OF SEA WAVES

The present invention relates to apparatus for recovering the kinetic energy bound in the wave movement of water, such as sea waves. The apparatus includes a bouyant unit and an energy-absorbing device connected thereto. The energy-absorbing device comprises an immersed rigid plunger or piston slideably arranged in a substantially vertical, elongate accelerating tube which is intended to be immersed in said water and which is open at both ends thereof and coupled to the bouyant unit, so as to accompany the movement imparted to said unit by the wave motion.

In known kinetic-energy recovering apparatus as shown in applicant's prior patent U.S. Pat. No. 4,277,690 of this kind there is no limit to the extent of travel of the piston within the accelerating tube. Consequently, the piston or piston rod are liable to be damaged when subjected to excessive forces, for example when subjected to forces eminating from very rough or heavy seas. In those known cases where the piston is arranged in a widened portion of the accelerating tube, there is the further risk of the piston striking the surfaces defining the bottom of this widened portion, when the sea is rough or heavy, resulting in damage to the piston or piston rod.

An object of the present invention is to provide an apparaus for recovering the kinetic energy of water waves, having a piston which is arranged for movement within an accelerating tube and the extent of movement of which piston is limited in such a manner that the force acting on the piston is greatly reduced when the piston reaches the limit positions of said extent of piston movement.

Accordingly, there is provided an apparatus having the characterizing features set forth in the accompanying claims.

The invention will now be described in more detail with reference to exemplary embodiments illustrated schematically in the accompanying drawing, in which FIG. 1 illustrates in perspective a first embodiment of an apparatus constructed in accordance with the invention, comprising a bouyant unit and an accelerating tube;

FIG. 2 is a longitudinal sectional view of that part of the apparatus shown in FIG. 1 which incorporates the limit means for restricting the extent of piston travel and for abrogating the force acting on the piston; and FIG. 3 is a longitudinal sectional view of a further embodiment of an accelerating tube in an apparatus constructed in accordance with the invention, the Figure also showing that part of the accelerating tube which incorporates the piston-movement limiting means.

FIG. 4 is a longitudinal sectional view of a still further embodiment of an accelerating tube in an apparatus constructed in accordance with the invention, the Figure showing that part of the accelerating tube which incorporates the piston-movement limiting means.

The apparatus illustrated in FIG. 1 comprises mainly an accelerating tube 1 open at its bottom end and a bouyant unit 2 mounted at its upper end. As illustrated, the apparatus is moored by means of mooring lines 3. The bouyancy of the bouyant unit 2 and the length of the accelerating tube 1 are such that the upper end 4 of the tube 1 lies beneath the surface of the water so that columns of water is captured in the tube 1.

A piston 6 having an elongated rod is slidably mounted in the accelerating tube, and in response to the changes in the column of water captured within the accelerating tube, moves up and down relative to the surrounding tube. The piston rod is connected but not shown manner to means in the bouyant unit 2 for converting the stroke of the piston relative to the bouyant unit into usable energy. As in the known devices of this type, the column of water within the tube 1 is substantially uneffected by the wave action of the water, however, the tube 1 and bouyant unit 2 which float on the water is effected by the use and fall of the water. When the tube 1 and bouyant unit are accelerated upward by the rising water, they move relative to the piston 6 in the substantially quiescent column in the tube, however, an excess pressure is exerted on the bottom of the piston 6 (i.e., on the bottom of the column of water above the piston) while simultaneously a subpressure is exerted on the top of the piston 6 (i.e., on the top of column of water below the piston) due to the movement of the tube 1. Thus, the piston would be driven upwardly and would tend to continue its upward movement even after the tube 1 and bouyant unit 2 stop or are reversed in their own movement. When the tube 1 and bouyant unit are accelerated downwardly by the water, the opposite effects are obtained. Limitations of the extent of up and down movement of the piston is obtained by the present invention.

In the embodiment of FIG. 2, the maximum distance travelled by the piston 6 is shown by means of the double-headed arrow 5. The piston 6 is provided with a bottom cylindrical skirt having openings 8 adjacent its upper end. The accelerating tube 1 is provided with corresponding openings 9 in region of the lower end 10 of the piston skirt 7. When the piston 6 is moved upwardly from the position illustrated in FIG. 2, water is able to stream freely through the then unobstructed openings 9, thereby to equalize the forces acting on the piston by relieving the piston of the excess pressure forces on its lower surface. This means that the position in which the piston is shown in FIG. 2 constitutes the highest position to which the piston 6 can move in the tube 1. When the piston 6 moves downwardly the openings 8 in the cylindrical surface of the piston skirt 7 reach a position at which they are in register with the openings 9 in the tube 1, the water pressure within the tube 1 and the water pressure externally of said tube will be equalized, thereby relieving the load on the upper surface of the piston 6. This constitutes the lowermost position to which the piston of the embodiment illustrated in FIG. 2 can move. Thus, the length of stroke of the piston is limited to a highest level L according to FIG. 2, irrespective of the height of the waves.

In the FIG. 3 embodiment, the length of stroke M of a piston 11 is restricted by an upper and a lower widening 12 and 13 respectively, arranged in the accelerating tube 14. When the piston 11 reaches a position, during its upward movement, at which it is accommodated in the widening 12 the water releases its excess pressure against the underside of the piston and rushes past the piston, into the space between the outer cylindrical surface of the piston 11 and the wall defining said widening 12. This causes the piston 11 to remain in said position. Correspondingly, when moving downwardly the piston 11 will reach a position in which it is accommodated in the lower widening 13, and will remain in this position due to the release of the excess pressure on the top surface of the piston equalization of forces acting on the top and bottom working surfaces of the piston. Thus, the working stroke of the piston is restricted to the distance M, irrespective of the height of the waves or the roughness of the sea.

In the FIG. 4 embodiment, the length of stroke N of a piston 15 is restricted to the length of a cylindrical insert 16 which is arranged coaxially inside tube 17. Insert 16 is attached to tube 17 via an upper and a lower ring 18 and 19 respectively. Between insert 16 and tube 17 there is a filling 20. When piston 15 reaches a position outside the insert 16 the piston 15 is guided by guides 21 and 22 until water releases its pressure against the respective upper and lower surfaces of the piston substantially in the manner described with reference to FIG. 3.

What is claimed:

1. In apparatus for recovering kinetic energy bound in the movement of water waves, having a bouyant unit and an energy-absorbing device connected to the bouyant unit comprising an immersed rigid piston slideably arranged in a substantially vertical, elongate accelerating tube immersed in said water, said tube being open at both ends and connected to the bouyant unit so as to accompany the movement of said unit imparted thereto by said wave movement, the improvement including means for limiting the movement of the working stroke of the piston in the accelerating tube, said means being incorporated in the accelerating tube and arranged to abrogate or reduce the forces acting on the piston.

2. The apparatus according to claim 1, wherein the movement-limiting means comprises at least one opening in the accelerating tube arranged to co-act with at least one corresponding opening in the piston.

3. An apparatus according to claim 1, wherein said movement-limiting means comprises at least one widened portion in the accelerating tube.

4. The apparatus according to claim 1, wherein said movement-limiting means comprises at least one tubular insert arranged coaxially inside the accelerating tube.

* * * * *